(12) United States Patent
Yu

(10) Patent No.: US 12,179,118 B2
(45) Date of Patent: Dec. 31, 2024

(54) GAME DATA PROCESSING METHOD, STORAGE MEDIUM, AND ELECTRONIC DEVICE

(71) Applicant: NETEASE (HANGZHOU) NETWORK CO., LTD., Zhejiang (CN)

(72) Inventor: Weixiang Yu, Zhejiang (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 3 days.

(21) Appl. No.: 17/778,051

(22) PCT Filed: Jan. 29, 2021

(86) PCT No.: PCT/CN2021/074348
§ 371 (c)(1),
(2) Date: May 19, 2022

(87) PCT Pub. No.: WO2022/007394
PCT Pub. Date: Jan. 13, 2022

(65) Prior Publication Data
US 2022/0410014 A1 Dec. 29, 2022

(30) Foreign Application Priority Data

Jul. 10, 2020 (CN) .......................... 202010664331.0

(51) Int. Cl.
*A63F 13/00* (2014.01)
*A63F 13/69* (2014.01)
*A63F 13/73* (2014.01)

(52) U.S. Cl.
CPC .............. *A63F 13/73* (2014.09); *A63F 13/69* (2014.09)

(58) Field of Classification Search
CPC ............. G07F 17/3272; G07F 17/3237; G07F 17/3225; G07F 17/3239
See application file for complete search history.

(56) References Cited

U.S. PATENT DOCUMENTS 6,973,512 B1 * 12/2005 Koeman ............... G06F 13/102
710/36
2013/0254680 A1 * 9/2013 Buhr ....................... A63F 13/61
709/204
(Continued)

FOREIGN PATENT DOCUMENTS

CN 104254372 A 12/2014
CN 105050674 A 11/2015
(Continued)

*Primary Examiner* — David L Lewis
*Assistant Examiner* — Eric M Thomas
(74) *Attorney, Agent, or Firm* — Qinghong Xu

(57) ABSTRACT

A game data processing method, a storage medium, and an electronic device are disclosed. The method may include: a mapping relationship is established between a first client and a second client based on a first data transfer request from the first client; first game data of the first client is sent to the second client according to the mapping relationship; second game data from the second client is acquired, wherein the second game data is obtained through updating, by the second client, the first game data; the second game data is verified based on first user identification information of the first client to obtain a verification result; and in response to the verification result indicating that the second game data is approved, the first game data is updated to the second game data.

20 Claims, 6 Drawing Sheets

(56) References Cited

U.S. PATENT DOCUMENTS

| | | | |
|---|---|---|---|
| 2014/0006129 A1* | 1/2014 | Heath | .................... G06Q 30/02 705/14.23 |
| 2014/0235326 A1 | 8/2014 | Paracha et al. | |
| 2019/0141051 A1 | 5/2019 | Ikarashi | |

FOREIGN PATENT DOCUMENTS

| | | |
|---|---|---|
| CN | 107220820 A | 9/2017 |
| CN | 107730261 A | 2/2018 |
| CN | 107733864 A | 2/2018 |
| CN | 108401014 A | 8/2018 |
| CN | 110633969 A | 12/2019 |
| CN | 110910135 A | 3/2020 |
| CN | 111105219 A | 5/2020 |
| CN | 111773664 A | 10/2020 |

\* cited by examiner

GAME DATA PROCESSING METHOD, STORAGE MEDIUM, AND ELECTRONIC DEVICE

CROSS-REFERENCE TO RELATED APPLICATION

The present disclosure claims priority of Chinese patent application No. 202010664331.0, filed on Jul. 10, 2020 and named after "Game Data Processing Method and Apparatus, Storage Medium, and Electronic Device". Contents of the present disclosure are hereby incorporated by reference in its entirety of the Chinese Patent Application.

TECHNICAL FIELD

The present disclosure relates to the field of data processing, and in particular, to a game data processing method, a storage medium, and an electronic device.

BACKGROUND

At present, when game data is transferred, game data of a game being operated in a first terminal is usually sent to a second terminal having a communication connection relationship with the first terminal, so that the second terminal restores a game state according to the game data. However, when the game data of the first terminal is sent to the second terminal, the game data is not verified, and the game data may be abnormal, so that an accuracy of the game data cannot be ensured when the game data is transferred.

No effective solution is proposed at present for the technical problem in the conventional art that the accuracy of game data cannot be ensured when the game data is transferred.

SUMMARY

According to one aspect of the embodiments of the present disclosure, a game data processing method is provided, which may include the following steps: a mapping relationship is established between a first client and a second client based on a first data transfer request from the first client; first game data of the first client is issued to the second client according to the mapping relationship; second game data from the second client is acquired, wherein the second game data is obtained through updating, by the second client, the first game data; The second game data is verified based on first user identification information of the first client to obtain a verification result; in response to the verification result indicating that the second game data is approved, the first game data is updated to the second game data.

According to another aspect of the embodiments of the present disclosure, another game data processing method is also provided, which may include the following steps: a second client acquires first game data of a first client, wherein the first game data is sent by a server according to a mapping relationship between the first client and the second client, and the mapping relationship is established by the server based on a first data transfer request from the first client; the second client updates the first game data to obtain second game data; the second client sends the second game data to the server, wherein the second game data is verified by the server based on first user identification information of the first client to obtain a verification result, and in response to the verification result indicating that the second game data is approved, the first game data is updated to the second game data.

According to another aspect of the embodiments of the present disclosure, another game data processing method is also provided, which may include the following steps: a first client sends a first data transfer request to a server, wherein the first data transfer request is used for enabling the server to establish a mapping relationship between the first client and a second client; the first client acquires second game data sent by the server, wherein the second game data is approved by the server based on first user identification information of the first client, the second game data is obtained through updating, by the second client, the first game data of the first client, and the first game data is sent to the second client by the server according to the mapping relationship.

According to another aspect of the embodiments of the present disclosure, a game data processing apparatus is also provided. The apparatus includes at least one processor, and at least one memory for storing a program element, wherein the program element is executed by the at least one processor and may include: an establishment component, configured to establish a mapping relationship between a first client and a second client based on a first data transfer request from the first client; an sending component, configured to send first game data of the first client to the second client according to the mapping relationship; a first acquisition component, configured to acquire second game data from the second client, wherein the second game data is obtained through updating, by the second client, the first game data; a verification component, configured to verify the second game data based on first user identification information of the first client to obtain a verification result; and a first update component, configured to update the first game data to the second game data in response to the verification result indicating that the second game data is approved.

According to another aspect of the embodiments of the present disclosure, another game data processing apparatus is also provided. The apparatus includes at least one processor, and at least one memory for storing a program element, wherein the program element is executed by the processor and may include: a second acquisition component, configured to enable a second client to acquire first game data of a first client, the first game data being sent by a server according to a mapping relationship between the first client and the second client, and the mapping relationship is established by the server based on a first data transfer request from the first client; a second update component, configured to enable the second client to update the first game data to obtain second game data; and a first sending component, configured to enable the second client to send the second game data to the server, the second game data being verified by the server based on first user identification information of the first client to obtain a verification result, and in response to the verification result indicates that the second game data is approved, the first game data being updated to the second game data.

According to another aspect of the embodiments of the present disclosure, another game data processing apparatus is also provided. The apparatus includes at least one processor, and at least one memory for storing a program element, wherein the program element is executed by the processor and may include: a second sending component, configured to enable a first client to send a first data transfer request to a server, the first data transfer request being used for enabling the server to establish a mapping relationship between the first client and a second client; and a third acquisition component, configured to enable the first client to acquire second game data sent by the server, the second game data being approved by the server based on first user identification information of the first client, the second game data being data obtained after the second client updates the first game data of the first client, and the first game data being sent to the second client by the server according to the mapping relationship.

According to another aspect of the embodiments of the present disclosure, a non-transitory storage medium is provided. A computer program is stored in the non-transitory storage medium. A device where the non-transitory storage medium is located is controlled to perform the following steps:

a mapping relationship is established between a first client and a second client based on a first data transfer request from the first client; first game data of the first client is sent to the second client according to the mapping relationship; second game data from the second client is acquired, wherein the second game data is obtained through updating, by the second client, the first game data; The second game data is verified based on first user identification information of the first client to obtain a verification result; in response to the verification result indicating that the second game data is approved, the first game data is updated to the second game data.

According to another aspect of the present disclosure, an electronic device is provided. The electronic device includes a processor and a memory connected to the processor and configured to store an executable instruction of the processor. The processor is configured to execute the computer program to perform the following steps: a mapping relationship is established between a first client and a second client based on a first data transfer request from the first client; first game data of the first client is sent to the second client according to the mapping relationship; second game data from the second client is acquired, wherein the second game data is obtained through updating, by the second client, the first game data; The second game data is verified based on first user identification information of the first client to obtain a verification result; in response to the verification result indicating that the second game data is approved, the first game data is updated to the second game data.

DETAILED DESCRIPTION OF THE EMBODIMENTS

Figure 1:
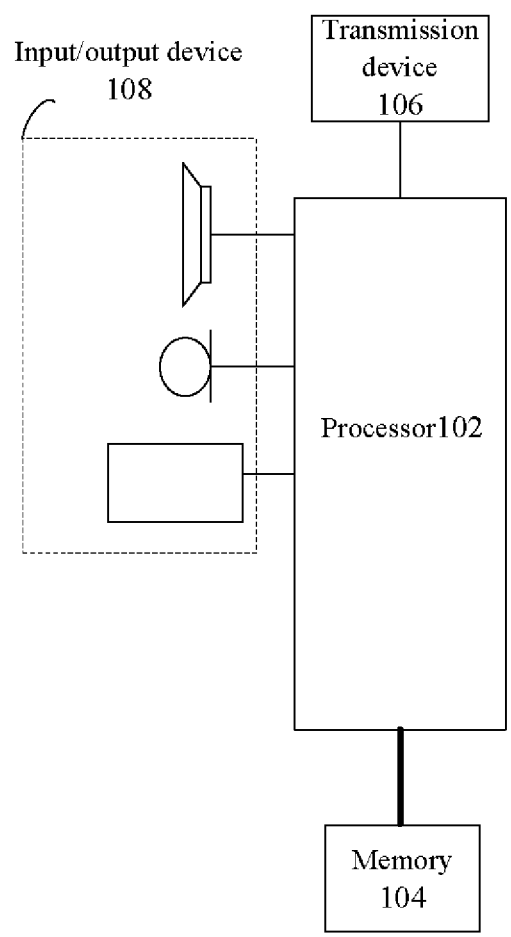
FIG. 1 is a block diagram of a hardware structure of a mobile terminal of a game data processing method according to one embodiment of the present disclosure.

It should be noted that in a case of no conflict, the features in the embodiments and the embodiments in the present disclosure may be combined with each other. The disclosure is described below with reference to the drawings and in conjunction with the embodiments in detail.

In order to make those skilled in the art better understand technical solutions of the present disclosure, the technical solutions in the embodiments of the present disclosure will be clearly and completely described below with reference to drawings in the embodiments of the present disclosure. It is apparent that the described embodiments are only a part of the embodiments of the present disclosure, not all of the embodiments. On the basis of the embodiments of the present disclosure, all other embodiments obtained on the premise of no creative work of those of ordinary skill in the art should fall within a scope of protection of the present disclosure.

It should be noted that the description and claims of the disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the disclosure described here can be implemented. In addition, terms "include" and "have" and any variations thereof are intended to cover non-exclusive inclusions. For example, it is not limited for processes, methods, systems, products or devices containing a series of steps or components to clearly list those steps or components, and other steps or components which are not clearly listed or are inherent to these processes, methods, products or devices may be included instead.

At least one method embodiment provided by the embodiments of the present disclosure may be implemented in a mobile terminal, a computer terminal or a similar computing device. Taking operation on a mobile terminal as an example, FIG. 1 is a block diagram illustrating a hardware structure of a mobile terminal of a game data processing method according to one embodiment of the present disclosure. As shown in FIG. 1, the mobile terminal may include at least one (only one is shown in FIG. 1) processor 102 (the processor 102 may include but is not limited to a processing apparatus such as a Micro Controller Unit (MCU) or a Field Programmable Gate Array (FPGA)) and a memory 104 for storing data. Optionally, the above mobile terminal may further include a transmission device 106 and an input/output device 108 for communication functions. Those skilled in the art can understand that the structure shown in FIG. 1 is merely illustrative, and does not limit the structure of the above mobile terminal. For example, the mobile terminal may also include more or fewer components than shown in FIG. 1, or has a different configuration from that shown in FIG. 1.

The memory 104 may be configured to store a computer program, for example, a software program and module of application software, such as a computer program corresponding to a game data processing method in the embodiment of the present disclosure, and the processor 102 executes various functional applications and data processing by running the computer program stored in the memory 104, that is to say, the above method is implemented. The memory 104 may include a high speed random access memory and may also include a non-transitory memory such as at least one magnetic storage device, a flash memory, or other non-transitory solid state memories. In some examples, the memory 104 may further include at least one memory remotely located relative to the processor 102, which may be connected to the mobile terminal over a network. The examples of such networks include, but are not limited to, the Internet, the Intranet, local area networks, mobile communication networks, and combinations thereof.

The transmission device 106 is configured to receive or send data via a network. The above specific network example may include a wireless network provided by a communication provider of the mobile terminal. In one example, the transmission device 106 includes a Network Interface Controller (NIC) that may be connected to other network devices through a base station to communicate with Internet. In one example, the transmission device 106 may be a Radio Frequency (RF) module for communicating with the Internet wirelessly.

Figure 2:
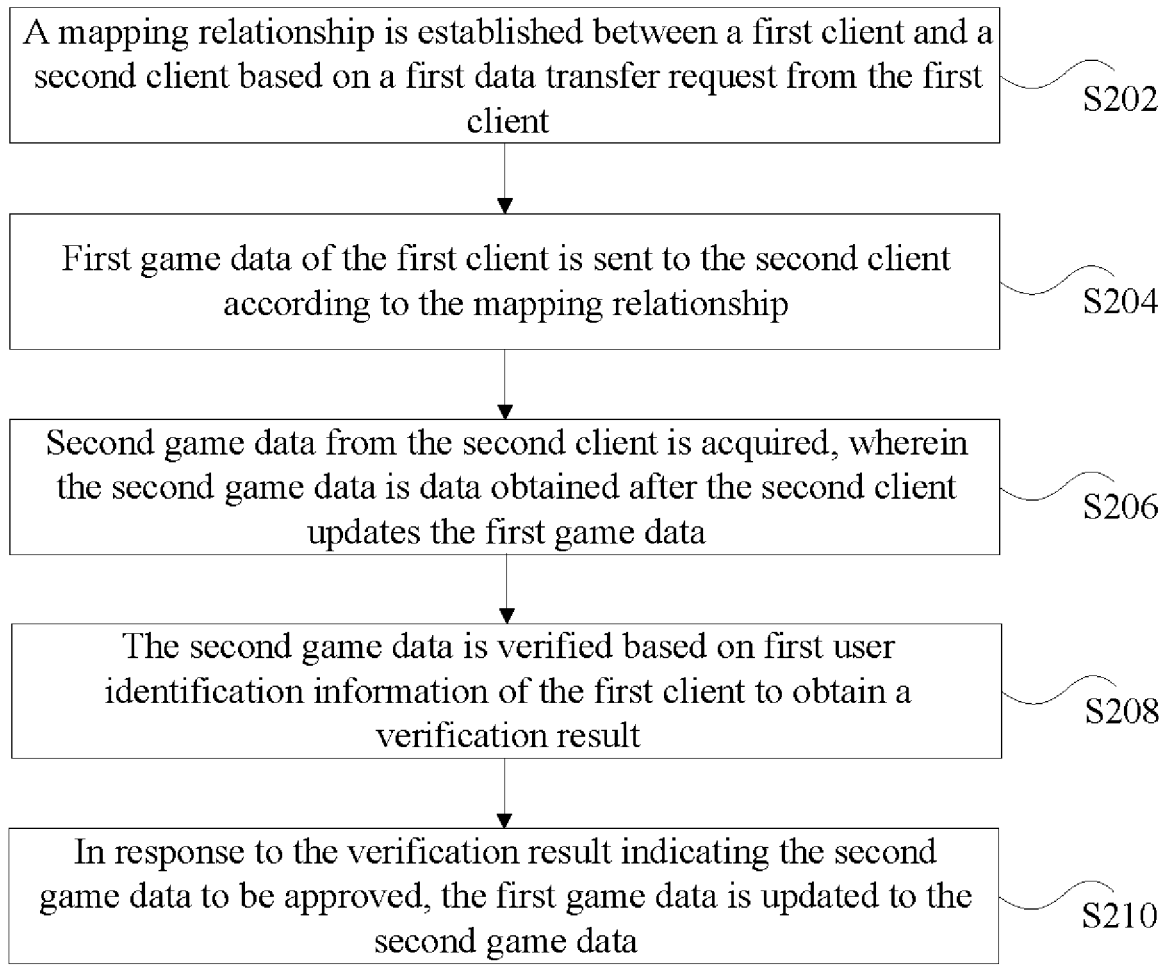
FIG. 2 is a flowchart of a game data processing method according to one embodiment of the present disclosure.

In the present embodiment, game data processing method running on the above mobile terminal is provided. The method may be performed by a server. FIG. 2 is a flowchart of a game data processing method according to one embodiment of the present disclosure. As shown in FIG. 2, the method may include the following steps.

At step S202, a mapping relationship is established between a first client and a second client based on a first data transfer request from the first client.

In the technical solution provided by the step S202 of the present disclosure, the first client is a client logged in through a first account, and the second client is a client logged in through a second account; or the first client is a client running on a first terminal, and the second client is a client running on a second terminal. The first client and the second client may both be clients used for playing a reloadable game.

In the present embodiment, when the first client has a need to transfer game data to the second client, for example, when the first client needs to transfer battle game data to the second client to continue a battle operation, the server may acquire a first data transfer request from the first client, and the first data transfer request is used for requesting the server to transfer the game data. The server may establish a mapping relationship between the first client and the second client based on the first data transfer request of the first client. The second client is an object to which the server needs to transfer the game data originally belonging to the first client, and the second client replaces the first client to perform a game operation, so as to complete the current game.

At step S204, first game data of the first client is sent to the second client according to the mapping relationship.

In the technical solution provided by the step S204 of the present disclosure, after the server establishes the mapping relationship between the first client and the second client, first game data of the first client is sent to the second client according to the mapping relationship.

In the present embodiment, the server acquires the first game data of the first client, which may be battle data of a game in which the first client participates and information of a virtual character previously controlled by the first client before sending the first data transfer request. The server determines the second client based on the mapping relationship and then sends the first game data to the second client, and the second client may load the first game data to enter the game originally entered by the first client so as to restore a game state of the game.

At step S206, second game data from the second client is acquired, wherein the second game data is obtained through updating, by the second client, the first game data.

In the technical solution provided by step the S206 of the present disclosure, after the server sends the first game data of the first client to the second client according to the mapping relationship, the second client updates the first game data to obtain second game data, and the server acquires the second game data.

In the present embodiment, the second game data is operation data operated by the second client which takes place of the first client to participate in the game, for example, data directly generated for a moving operation, a release skill operation, etc., or data calculated based on the directly generated data, which is not specifically limited thereto.

At step S208, the second game data is verified based on first user identification information of the first client to obtain a verification result.

In the technical solution provided by the step S208 of the present disclosure, after the server acquires the second game data from the second client, the second game data is verified based on the first user identification information of the first client to obtain a verification result.

In the present embodiment, the second game data is related to a virtual character previously controlled by the first client and cannot be related to other virtual characters. That is to say, the second game data is unique to the virtual character previously controlled by the first client. The server in the present embodiment may verify the second game data to ensure that the second game data is unique and legitimate. The server may acquire second user identification information of the second client from the second game data, and the second user identification information is a unique user identifier (user_id) of the second client. Then, first user identification information of the first client is acquired based on the pre-established mapping relationship. That is to say, the first user identification information is a unique user identifier (user_id) of the first client. Then, the second game data is calculated and verified through the first user identification information to obtain a verification result.

At step S210, in response to the verification result indicating that the second game data is approved, the first game data is updated to the second game data.

In the technical solution provided by the step S210 of the present disclosure, after the server verifies the second game data based on the first user identification information of the first client to obtain the verification result, the server judges whether the verification result indicates that the second game data is approved. The first game data is updated to the second game data in response to the verification result indicating that the second game data is approved.

In the present embodiment, in response to the verification result indicating that the second game data is approved, the second game data is determined valid and the original first game data of the first client may be updated. Optionally, the first game data is an original position of the virtual character previously controlled by the first client, the second game data is a moving request of the virtual character sent by the second client, and the moving request may include a moving direction and a moving distance of the virtual character in a game scene. The server verifies and calculates the latest position of the virtual character, and the original position of the virtual character is updated. Optionally, the second game data is a skill ID sent by the second client, which may be a position, a direction, a designated object, or no object, depending on different skill types. In summary, the second client sends all necessary data to the server, and the server calculates all the necessary data to obtain the second game data, such as skill hit objects, hit effects and at least one related parameter, through which the first game data is updated. That is to say, although the second client in the present embodiment performs a game operation in place of the first client, an attribution of game data is not changed, the first game data of the first client is updated on the server with the second game data, and a game result may be stored in a relevant data table from the first client after the game is ended. For example, the number of wins and losses calculated, points and hero proficiency and so on are stored in the relevant data table from the first client, so that only data of the first client is affected by the game result.

The second game data of the present embodiment is changeable data, which may be stored, verified, calculated, and forwarded by the server. when second game data is stored, verified, calculated, and forwarded by a client, uncontrollable situations such as instability (client offline) and cheating (client plug-in) may occur.

Through steps S202 to S210 in the present embodiment, a mapping relationship is established between a first client and a second client based on a first data transfer request from the first client. First game data of the first client is sent to the second client according to the mapping relationship. Second game data from the second client is acquired, wherein the second game data is obtained through updating, by the second client, the first game data. The second game data is verified based on first user identification information of the first client to obtain a verification result. In response to the verification result indicating that the second game data is approved, the first game data is updated to the second game data. That is to say, in the present disclosure, the game data is allowed to be transferred between different clients through the server, the obtained game data is verified, uniqueness, stability and accuracy of the game data is ensured, the technical problem that the accuracy of the game data cannot be ensured is solved when the game data is transferred, and thus the technical effect of ensuring the accuracy of the game data when the game data is transferred is achieved.

The above method of the present embodiment is further described below.

As an optional implementation method, before the second game data from the second client is acquired at step S206, the method further includes the following step: breaking a connection between the server and the first client, wherein an operation of breaking the connection is used for making the second client be an unique operation object to perform data interaction with the server.

In the present embodiment, in order to ensure uniqueness of an operation object, after determining that the second client performs the game operation in place of the first client, the server and the first client may be disconnected before the second game data of the second client is acquired, so that the server does not acquire a data request from the first client, but performs data interaction with the second client, and verifies a data request from the second client, thereby the uniqueness of the operation object is ensured.

It should be noted that the virtual character belonging to the second client can no longer continue to participating in the game after the second client performs the game operation in place of the first client in the present embodiment.

As an optional implementation method, after the second game data from the second client is acquired at step S206, the method further includes the following steps: second user identification information of the second client is acquired from the second game data; it is determined if the second user identification information is in a target field; the first user identification information corresponding to the second user identification information is acquired from the target field.

In the present embodiment, the second game data sent by the second client carries the second user identification information of the second client. After the server acquires the second game data from the second client, the server first extracts the second user identification information from the second game data, and then may check whether the second user identification information is in a target field in a record data table, wherein the target field may be a field with a key replace_user_id. The record data table may be a battle record table for recording battle data. When it is determined that the second user identification information is in the target field, the first user identification information corresponding to the second user identification information may be acquired from the target field.

As an optional implementation method, at step S208, the second game data is verified based on first user identification information of the first client to obtain the verification result includes the following operations: identification information of a virtual character is acquired from the second game data; It is determined that the second game data is approved in response to that the identification information of the virtual character is associated with the acquired first user identification information.

In the present embodiment, the second game data obtained from the game operation performed by the second client must be related to the virtual character associated with the first client, that is to say, the second game data obtained from the game operation performed by the second client must be related to the virtual character previously controlled by the first client. The server acquires identification information of the virtual character from the second game data. The identification information may be a skill identifier (ID) of the virtual character. When the identification information of the virtual character in the second game data is associated with the first user identification information acquired, that is to say, the second game data is for the first client, and it may be determined that the second game data is approved. For example, if the second client requests to use a certain skill for the server, the skill ID cannot be a skill ID of other virtual characters, but only a skill ID of the virtual character previously controlled by the first client. Optionally, in the present embodiment, a storage of the second game data may be bound to a first user identifier of the first client by which it may be verified whether the second game data is legitimate.

As an optional implementation method, at step S202, a mapping relationship between a first client and a second client is established based on the first data transfer request from the first client includes the following operations: second user identification information of the second client is acquired from the first data transfer request; the second user identification information is verified; in response to the second user identification information is approved, the mapping relationship is established between the first client and the second client.

In the present embodiment, the second user identification information of the second client may be carried in the first data transfer request, when there is a need for the first client to continue playing the game operation by the second client. After the server obtains the first data transfer request, the second user identification information may be identified from the first data transfer request, and the second user identification information may be verified. For example, whether the second user identification information is correct is verified. When the second user identification information is correct, it is determined that the second user identification information is approved. When the second user identification information is not correct, it may be determined that the second user identification information is not approved. The mapping relationship is established between the first client and the second client when the second user identification information is approved.

As an optional implementation method, the mapping relationship is established between the first client and the second client when the second user identification information is approved includes the following operations; a second data transfer request is sent to the second client when the second user identification information is approved; a response result is acquired, wherein the response result is sent by the second client in response to the second data transfer request; in response to the response result indicating that the second client allows to update the first game data, the mapping relationship is established between the first client and the second client.

In the present embodiment, when the server approves the second user identification information, the second data transfer request may be sent to the second client, which may be a notification message obtained when the second user identification information is approved. Optionally, the server in the present embodiment may also forward the first data transfer request to the second client as the second data transfer request. After the second data transfer request is received by the second client, the second client responds to the second data transfer request to obtain a response result and may enter a game display notification interface, which may display the notification message for inquiring whether the second client may continue to participate in the game in place of the first client. When the second client determines to continue participating in the game in place of the first client, a response result may be sent to the server, wherein the response result is used for indicating that the second client allows the first game data to be updated, that is to say, the second client agrees to a request for data transfer. A one-to-one correspondence relationship is established between the first client and the second client at this moment.

As an optional implementation method, at step S202, a mapping relationship between a first client and a second client is established includes the following operation: the first user identification information and the second user identification information are recorded in a target field.

In the present embodiment, when the mapping relationship is specifically established between the first client and the second client, the first user identification information of the first client and the second user identification information of the second client may be recorded in the target field, which may be a field with a key replace_user_id in the data record table for subsequently verifying the second game data obtained by the game operation of the second client.

As an optional implementation method, the first game data is updated to the second game data includes the following operations: a target data table from the first client is acquired; the first game data in the target data table is updated to the second game data.

In the present embodiment, when the first game data is updated to the second game data, a target data table bound with the first client may be acquired after the current game is ended. The target data table may be used for storing the original first game data of the first client. For example, the original first game data is the number of wins and losses, points, hero proficiency, etc. When the server approves the second game data, the first game data in the target data table may be updated to the second game data. For example, the number of wins and losses, the points, the hero proficiency, etc. in the target data table may be updated.

An embodiment of the present disclosure also provides another game data processing method from the second client side.

Figure 3:
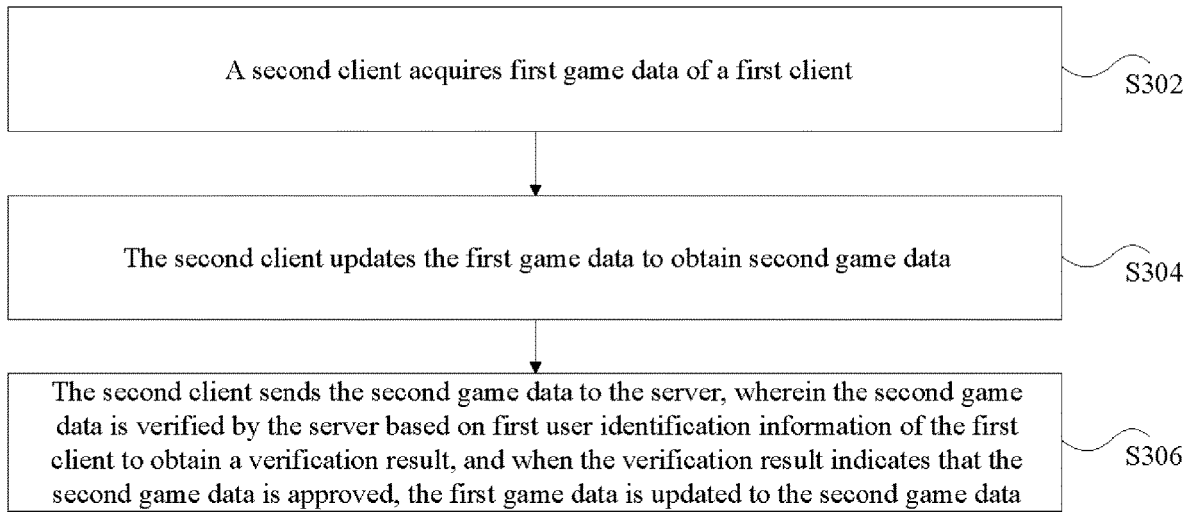
FIG. 3 is a flowchart of another game data processing method according to one embodiment of the present disclosure.

FIG. 3 is a flowchart of another game data processing method according to one embodiment of the present disclosure. As shown in FIG. 3, the method may include the following steps.

At step S302, a second client acquires first game data of a first client.

In the technical solution provided by the step S302 of the present disclosure, the first game data is sent by a server according to a mapping relationship between the first client and the second client, and the mapping relationship is established by the server based on a first data transfer request from the first client.

In the present embodiment, the second client is a client capable of performing a game operation in place of the first client, and the second client acquires first game data of the first client sent by the server, wherein a first data transfer request from the first client is acquired by the server, and the first data transfer request is used for requesting the server to transfer game data. The second client and the first client in the present embodiment have a mapping relationship which may be established by the server based on the first data transfer request.

The second client acquires first game data sent by the server according to the mapping relationship. The first game data may be battle data of a game in which the first client participates and information of a virtual character previously controlled by the first client before the first data transfer request is sent. The second client may load the first game data, to enter the game originally entered by the first client, and restore a game state of the game.

At step S304, the second client updates the first game data to obtain second game data.

In the technical solution provided by the step S304 of the present disclosure, after the second client acquires the first game data of the first client, the second client updates the first game data to obtain second game data.

In the present embodiment, the second game data is operation data operated by the second client which takes place of the first client to participate in the game, for example, data directly generated for a moving operation, a release skill operation, etc., or data calculated based on the directly generated data, which is not specifically limited thereto.

At step S306, the second client sends the second game data to the server, wherein the second game data is verified by the server based on first user identification information of the first client to obtain a verification result, and when the verification result indicates that the second game data is approved, the first game data is updated to the second game data.

In the technical solution provided by the step S306 of the present disclosure, after the second client updates the first game data to obtain the second game data, the second client sends the second game data to the server so that the server verifies the second game data.

In the present embodiment, the second game data is related to a virtual character previously controlled by the first client and cannot be related to other virtual characters. That is to say, the second game data is unique to the virtual character previously controlled by the first client. The second game data in the present embodiment may be verified by the server to ensure that the second game data is unique and legitimate. Optionally, the second game data includes second user identification information of the second client, first user identification information of the corresponding first client may be acquired by the server through the mapping relationship, and the first user identification information is used for calculating and verifying the second game data to obtain a verification result.

In the present embodiment, when the verification result indicates that the second game data is approved, the second game data is valid and the original first game data of the first client may be updated. The second client of the present embodiment may send all necessary data to the server, and the server calculates all necessary data to obtain second game data, such as skill hit objects, hit effects and at least one related parameter, through which the first game data is updated. That is to say, although the second client in the present embodiment performs a game operation in place of the first client, an attribution of the game data is not changed. The first game data of the first client is updated on the server using the second game data, and a game result may be stored in a relevant data table from the first client after the game is ended, so that only data of the first client is affected by the game result.

As an optional implementation method, before the second client acquires the first game data of the first client at step S302, the method further includes the following steps: the second client acquires a second data transfer request, wherein the second data transfer request is sent by the server in response to that the second user identification information of the second client is approved; the second client sends a response result to the server in response to the second data transfer request. The response result is used for indicating that the second client allows updating of the first game data.

In the present embodiment, the second client acquires a second data transfer request sent by the server. The second data transfer request may be a notification message obtained when the second user identification information is approved. After the second data transfer request is received, the second client responds to the second data transfer request to obtain a response result and may enter a game opening notification interface, which may display the notification message for inquiring whether the second client may continue to participate in the game in place of the first client. When the second client determines to continue participating in the game in place of the first client, a response result may be sent to the server, wherein the response result indicates that the second client allows the first game data to be updated, that is to say, the second client agrees to a request for data transfer. A one-to-one correspondence relationship is established between the first client and the second client at this moment.

An embodiment of the present disclosure also provides another game data processing method from a first client side.

Figure 4:
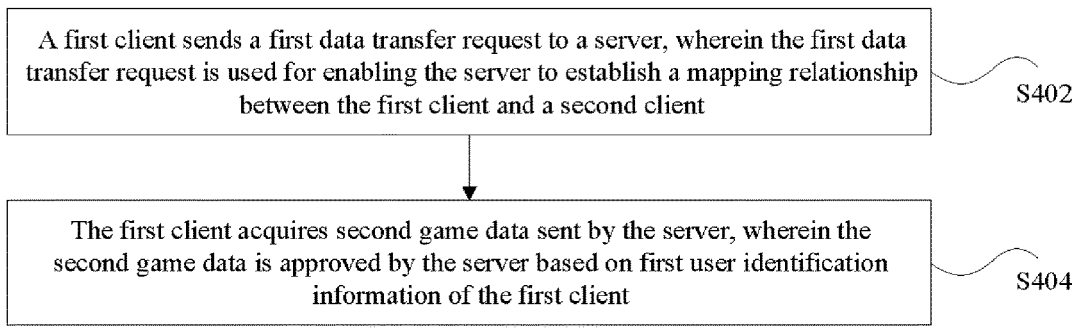
FIG. 4 is a flowchart of another game data processing method according to one embodiment of the present disclosure.

FIG. 4 is a flowchart of another game data processing method according to one embodiment of the present disclosure. As shown in FIG. 4, the method may include the following steps.

At step S402, a first client sends a first data transfer request to a server, wherein the first data transfer request is used for enabling the server to establish a mapping relationship between the first client and a second client.

In the technical solution provided by the step S402 of the present disclosure, when the first client needs to transfer game data of the second client, a first data transfer request may be sent to the server, wherein the first data transfer request is used for requesting the server to transfer the game data, so that the server may establish a mapping relationship between the first client and the second client based on the first data transfer request.

At step S404, the first client acquires second game data sent by the server, wherein the second game data is approved by the server based on first user identification information of the first client.

In the technical solution provided by the step S404 of the present disclosure, after the first client sends the first data transfer request to the server, the first client acquires second game data sent by the server, wherein the second game data is approved by the server based on first user identification information of the first client, the second game data is obtained through updating, by the second client, the first game data of the first client, and the first game data is sent to the second client by the server according to the mapping relationship.

In the present embodiment, the first client sends the first game data to the server, which may be battle data of a game in which the first client participates and information of a virtual character previously controlled by the first client before the first client sending the first data transfer request. When the first game data is sent to the second client by the server, the first game data may be loaded by the second client, so that the first client enters the game originally entered by the first client, and a game state of the game is restored. The first game data is updated by the second client to obtain second game data. The second game data is operation data operated by the second client which takes place of the first client to participate in the game, for example, data directly generated for a moving operation, a release skill operation, etc., or data calculated based on the directly generated data, which is not specifically limited thereto.

The second game data is related to a virtual character previously controlled by the first client and cannot be related to other virtual characters. The first client acquires the second game data which is sent by the server and approved, the second game data may be unique and legitimate, and the second game data may be calculated and verified by the server through the first user identification information of the first client.

Optionally, the server updates the first game data to the second game data when the verification result indicates that the second game data is approved after the second game data is verified by the server based on the first user identification information of the first client to obtain the verification result.

In the present embodiment, although the second client performs a game operation in place of the first client, an attribution of the game data is not changed. The first game data of the first client is updated on the server using the second game data, and a game result may be stored in a relevant data table from the first client after the game is ended. For example, the number of wins and losses calculated, points and hero proficiency are stored in the relevant data table from the first client, so that only data of the first client is affected by the game result.

Optionally, in the present embodiment, accounts of two terminals may be the same when transferring game data between different first terminal and second terminal. When the same account is logged on the second terminal, the account of the first terminal will be logged out, there is a time difference (considered to be offline), and update data needs to be downloaded from the server. When game data is transferred between different first account and second account, whether the account can be on the same terminal or not is judged, but there is also a time difference, and update data needs to be downloaded from the server. Preferably, the game data transfer method in the present embodiment is adapted to transfer game data in the case where different terminals correspond to different account.

It should be noted that the above method in the present embodiment allows a player to transfer game data under different terminals and different account and verify the obtained game data, thereby there is a wider range of application scenarios and the uniqueness of the game data is determined. The game data of different terminals or accounts is transferred, the attribution of the game data is not changed, and the game data is still returned to a client corresponding to a player after the battle is ended. Moreover, the game data is verified and stored by the server and forwarded by the server, so that the game data is safe and stable, and the player can conveniently play the game.

The above method of the embodiment of the present disclosure is further illustrated below in conjunction with the preferred implementation method.

However, the above method is only for the need for a player to replace a terminal during the game. When the game data of the first terminal is sent to the second terminal, the second terminal needs time to load valid data. During a process of loading, the game data may be changed, the uniqueness of the game data is not verified, and the game data is abnormal when the game state of the game is restored on the second terminal. The method also does not consider the transfer of game data between different account. For example, a player may be busy temporarily and require someone to replace himself to complete a current battle, in which case data transfer between different account is required.

In the embodiment of the present disclosure, a player may be allowed to transfer the game data under different terminals and different account, and verify the game data, thereby the uniqueness of the game data is ensured. The game data from different terminals or accounts is transferred, the attribution of the game data is not changed, and the game data is returned to the terminal or account corresponding to the original player after the battle is ended.

In the present embodiment, after a client corresponding to player B takes over a game, only a data request of the client corresponding to player B is verified, and data connection between the server and the client corresponding to the player A is broken, so that the uniqueness of an operation object is ensured. Data forwarding between the client corresponding to the player A and the client corresponding to the player B is performed through the server, for example, a battle request and battle data is received.

The game data transfer method of in present embodiment may include the following steps:

At S1, a client corresponding to the player A requests a server to transfer game data to the client corresponding to the player B during a game playing process;

At S2, the server forwards the request to the client corresponding to the player B, the client corresponding to the player B agrees to transfer the game data, wherein the server records a mapping relationship between the player A and the player B;

At S3, the server sends the game data to the client corresponding to the player B;

At S4, the server acquires new game data obtained by a game operation of the client corresponding to the player B, performs player ID mapping, verifies legitimacy of the new game data, and updates the original game data through the new game data under the condition that the new game data is approved.

At S5, after the game is ended, a game result affects data of the client corresponding to the player A.

The above method in the present embodiment is further described below.

In a game, all changeable game data should be stored on a server, and all data operations on a client should be sent to the server for calculation, storage and forwarding by the server. For example, in a battle game, when a hero a in the client A needs to move, it is necessary to send a moving request to the server to inform the server of a moving direction and distance for the client A. The server verifies the moving direction and distance and calculates the latest position of the hero a, and then forwards the latest hero position of the hero a to each client, including the client A. Each client updates a position of local hero a according to the latest hero position from the server.

In the same way, when the client needs to release a skill, the client needs to send a skill ID to the server, which may be a position, a direction, a designated object, or no object, depending on different skill types. In short, all necessary data should be sent to the server. The server calculates all the necessary data to obtain, for example, skill hit objects, hit effects and at least one related parameter, which forwarded to each client by the server.

It can be seen from the above that a reloadable game may store variable data, which should be stored, verified, calculated, and forwarded by a reliable object such as the server. When a client is handed over for storage, verification, calculation, and forwarding, uncontrollable situations such as instability (client offline) and cheating (client plug-in) may occur.

In the present embodiment, when the player A wants some battle games to be continued by the player B, the client corresponding to the player A needs to send a first data transfer request to the server first, where in the first data transfer request may need to carry user identification information, such as user_id, of the client corresponding to the player B. The server verifies correctness of the player B, and then sends a notification message to the client corresponding to the player B.

After entering the game, the client corresponding to the player B opens a notification interface. The notification interface may display the above notification message. The client corresponding to the player B may choose whether to accept the continued battle game, and send a response result to the server if so.

After the above response result is received, the server terminates a battle connection with the client corresponding to the player A, and records alternate battle data of A->B in this battle. The alternate battle data may be current battle data and a control hero id (i.e. a virtual character previously controlled by the client corresponding to the player A). The server inserts the above data into a field with a key replace_user_id in the battle record data table, and records an user_id of the client corresponding to the player A and an user_id of the client corresponding to the player B, in order for the client corresponding to the player B to perform verification in a game operation. In the present embodiment, current battle data and the control hero id are sent to the client corresponding to the player B, and the client corresponding to the player B loads and enters the game.

In the present embodiment, when the game data is operation data and the client corresponding to the player B sends the operation data to the server during the battle game, the server will verify the operation data to check whether the client corresponding to the player B is in the field replace_user_id. If so, the user_id of the client corresponding to the player A is found therefrom. Calculation verification is performed on the above operation data according to the user_id of the client corresponding to the player A.

In the present embodiment, data operated by the client corresponding to the player B may be related to a hero controlled by the client corresponding to the player A. For example, when the client corresponding to the player B requests the server to use a certain skill, a skill ID of the skill cannot be a skill ID of other heroes but a skill ID of a hero previously used by the client corresponding to the player A. Generally speaking, storage of the game data will be bound to the user_id of the client corresponding to the player A, and it may be verified whether the above operation data is legitimate through the user_id of the client corresponding to the player A.

In the present embodiment, after the battle game ended, a data settlement should be stored in a relevant data table of the client corresponding to the player A. For example, the number of wins and losses, the increase or decrease of points, hero proficiency, etc., are stored back in the relevant data table of the client corresponding to the player A.

It should be noted that after the client corresponding to the player B takes over the battle game, the client corresponding to the player B replaces the client corresponding to the player A to the battle game, and the virtual character belonging to the client corresponding to the player B can no longer participate in the battle game.

The above method in the present embodiment allows a player to transfer the game data under different terminals and different account, and verify the obtained game data, thereby there is a wider range of application scenarios and determining the uniqueness of the game data. The game data of different terminals or accounts is transferred, the attribution of the game data is not changed, and the game data is still returned to a client corresponding to the player after the battle game is ended. Moreover, the game data is verified and stored by the server and forwarded by the server, so that the game data is safe and stable, and the player can conveniently play the game.

An embodiment of the present disclosure also provides a game data processing apparatus. The apparatus includes at least one processor, and at least one memory for storing a program element. The program element is executed by the processor. The program element includes an establishment component, an sending component, a first acquisition component, a verification component, and a first update component. It should be noted that the game data processing apparatus in the present embodiment may be used for performing the game data processing method in the embodiment of the present disclosure shown in FIG. 2.

Figure 5:
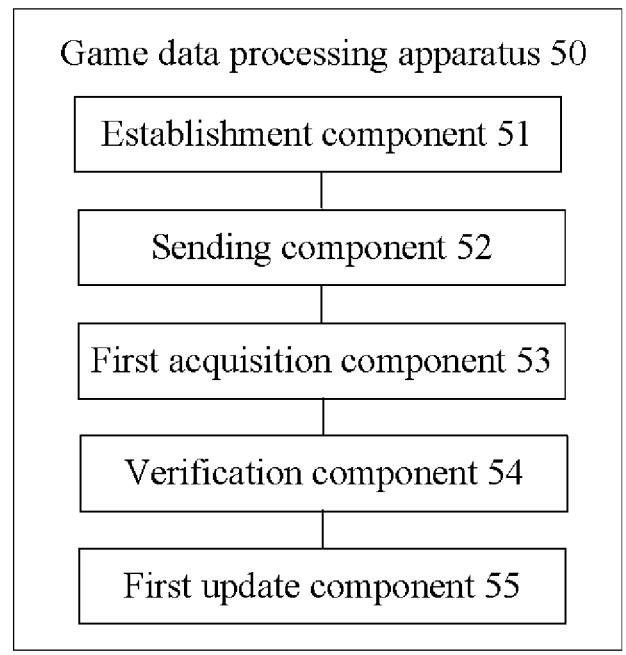
FIG. 5 is a schematic diagram of a game data processing apparatus according to one embodiment of the present disclosure.

FIG. 5 is a schematic diagram of a game data processing apparatus according to one embodiment of the present disclosure. As shown in FIG. 5, the game data processing apparatus 50 may include an establishment component 51, an sending component 52, a first acquisition component 53, a verification component 54, and a first update component 55.

The establishment component 51 is configured to establish a mapping relationship between a first client and a second client based on a first data transfer request from the first client.

The sending component 52 is configured to send first game data of the first client to the second client according to the mapping relationship.

The first acquisition component 53 is configured to acquire second game data from the second client, wherein the second game data is obtained through updating, by the second client, the first game data.

The verification component 54 is configured to verify the second game data based on first user identification information of the first client to obtain a verification result.

The first update component 55 is configured to update the first game data to the second game data in response to the verification result indicating that the second game data is approved.

It should be noted herein that the establishment component 51, the sending component 52, the verification component 53, the verification component 54, and the first update component 55 may be executed in a terminal as part of the apparatus. The functions implemented by the above components may be executed by the at least one processor in the terminal. The terminal may also be a smart phone (such as an Android phone or an iOS phone), a tablet computer, a palmtop, a Mobile Internet Device (MID), a PAD, or other terminal devices.

An embodiment of the present disclosure also provides another game data processing apparatus. The apparatus includes at least one processor, and at least one memory for storing a program element. The program element is executed by the processor. The program element includes a second acquisition component, a second update component, and a first sending component. It should be noted that the game data processing apparatus in the present embodiment may be used for performing the game data processing method in the embodiment of the present disclosure shown in FIG. 3.

Figure 6:
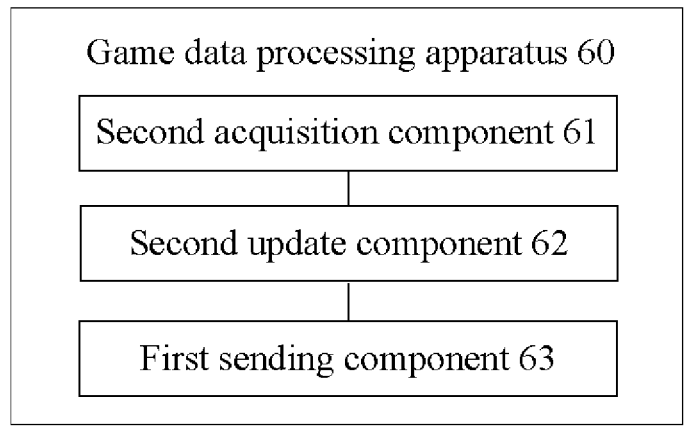
FIG. 6 is a schematic diagram of a game data processing apparatus according to one embodiment of the present disclosure.

FIG. 6 is a schematic diagram of another game data processing apparatus according to one embodiment of the present disclosure. As shown in FIG. 6, the game data processing apparatus 60 may include a second acquisition component 61, a second update component 62, and a first sending component 63.

The second acquisition component 61 is configured to enable a second client to acquire first game data of a first client. The first game data is sent by a server according to a mapping relationship between the first client and the second client, and the mapping relationship is established by the server based on a first data transfer request from the first client.

The second update component 62 is configured to enable the second client to update the first game data to obtain second game data.

The first sending component 63 is configured to enable the second client to send the second game data to the server, wherein the second game data is verified by the server based on first user identification information of the first client to obtain a verification result, and in response to the verification result indicating that the second game data is approved, the first game data is updated to the second game data.

It should be noted herein that the second acquisition component 61, the second update component 62, and the first sending component 63 may be executed in a terminal as part of the apparatus, and the functions implemented by the above components may be executed by at least one processor in the terminal.

An embodiment of the present disclosure also provides another game data processing apparatus. The apparatus includes at least one processor, and at least one memory for storing a program element. The program element is executed by the processor. The program element includes a second sending component and a third acquisition component. It should be noted that the game data processing apparatus in the present embodiment may be used for performing the game data processing method in the embodiment of the present disclosure shown in FIG. 4.

Figure 7:
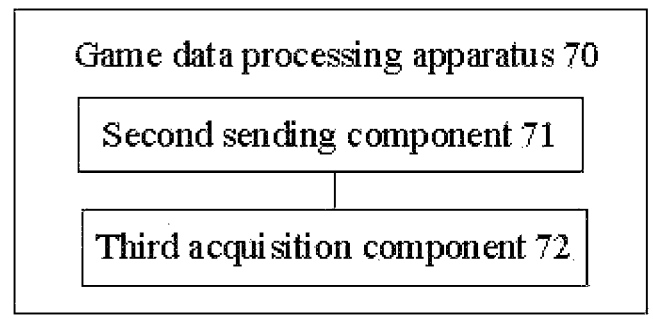
FIG. 7 is a schematic diagram of another game data processing apparatus according to one embodiment of the present disclosure.

FIG. 7 is a schematic diagram of another game data processing apparatus according to one embodiment of the present disclosure. As shown in FIG. 7, the game data processing apparatus 70 may include a second sending component 71 and a third acquisition component 72.

The second sending component 71 is configured to enable a first client to send a first data transfer request to a server, wherein the first data transfer request is used for enabling the server to establish a mapping relationship between the first client and a second client.

The third acquisition component 72 is configured to enable the first client to acquire second game data sent by the server, wherein the second game data is approved by the server based on first user identification information of the first client, the second game data is obtained through updating, by the second client, the first game data of the first client, and the first game data is sent to the second client by the server according to the mapping relationship.

It should be noted herein that the second sending component 71 and the third acquisition component 72 may be executed in a terminal as part of the apparatus, and the functions implemented by the above components may be executed by at least one processor in the terminal.

The game data processing apparatus in the present embodiment allows game data to be transferred between different clients through a server, the obtained game data is verified, the uniqueness, stability and accuracy of the game data is ensured, a technical problem that accuracy of the game data cannot be ensured when the game data is transferred is solved, and thus a technical effect of ensuring the accuracy of the game data when the game data is transferred is achieved.

An embodiment in the present disclosure also provides a non-transitory storage medium. The non-transitory storage medium stores a computer program that, when executed by a processor, controls a device where the non-transitory storage medium is located to perform the steps in any one of the above method embodiments.

The various functional components provided in the embodiments of the present disclosure may be executed in a game data processing apparatus or a similar operational apparatus, or may be stored as part of the non-transitory storage medium.

Figure 8:
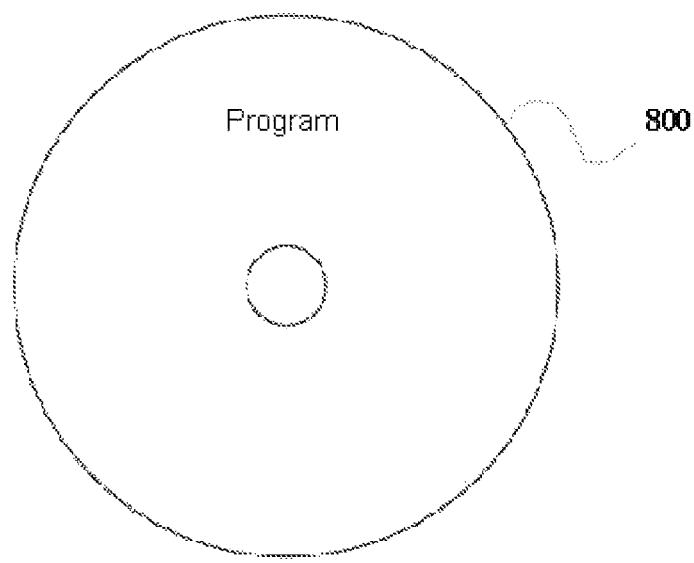
FIG. 8 is a schematic structure diagram of a non-transitory storage medium according to one embodiment of the present disclosure.

FIG. 8 is a schematic structure diagram of a non-transitory storage medium according to one embodiment of the present disclosure. As shown in FIG. 8, a program product 800 according to an implementation method of the present disclosure is described. A computer program is stored thereon. The computer program, when executed by a processor, has a program code implementing the following steps:

a mapping relationship is established between a first client and a second client based on a first data transfer request from the first client;

first game data of the first client is sent to the second client according to the mapping relationship;

second game data from the second client is acquired, wherein the second game data is obtained through updating, by the second client, the first game data;

the second game data is verified based on first user identification information of the first client to obtain a verification result.

in response to the verification result indicating that the second game data is approved, the first game data is updated to the second game data.

Optionally, the computer program, when executed by the processor, also has a program code implementing the following step: before the second game data from the second client is acquired, breaking a connection between the server and the first client, wherein an operation of breaking the connection is used for making the second client be an unique operation object to perform data interaction with the server.

Optionally, the computer program, when executed by the processor, also has a program code implementing the following steps: after the second game data from the second client is acquired, second user identification information of the second client is acquired from the second game data; it is determined if the second user identification information is in a target field; the first user identification information corresponding to the second user identification information is acquired from the target field.

Optionally, the computer program, when executed by the processor, also has a program code implementing the following steps: identification information of a virtual character is acquired from the second game data; it is determined that the second game data is approved in response to that the identification information of the virtual character is associated with the acquired first user identification information.

Optionally, the computer program, when executed by the processor, also has a program code implementing the following steps: second user identification information of the second client is acquired from the first data transfer request; the second user identification information is verified; in response to determining that the second user identification information is approved, the mapping relationship is established between the first client and the second client.

Optionally, the computer program, when executed by the processor, also has a program code implementing the following steps: in response to determining that the second user identification information is approved, a second data transfer request is sent to the second client; a response result is acquired, wherein the response result is sent by the second client in response to the second data transfer request; in response to the response result indicating that the second client allows to update the first game data, the mapping relationship is established between the first client and the second client.

Optionally, the computer program, when executed by the processor, also has a program code implementing the following step: the first user identification information and the second user identification information are recorded in a target field.

Optionally, the computer program, when executed by the processor, also has a program code implementing the following steps: a target data table from the first client is acquired; the first game data in the target data table is updated to the second game data.

As an optional example, the computer program, when executed by the processor, has a program code implementing the following steps:

a second client acquires first game data of a first client, wherein the first game data is sent by a server according to a mapping relationship between the first client and the second client, and the mapping relationship is established by the server based on a first data transfer request from the first client;

the second client updates the first game data to obtain second game data;

the second client sends the second game data to the server, wherein the second game data is verified by the server based on first user identification information of the first client to obtain a verification result, and in response to the verification result indicating that the second game data is approved, the first game data is updated to the second game data.

Optionally, the computer program, when executed by the processor, also has a program code implementing the following steps: before the second client acquires the first game data of the first client, the second client acquires a second data transfer request, wherein the second data transfer request is sent by the server in response to that the second user identification information of the second client is approved; the second client sends a response result to the server in response to the second data transfer request, wherein the response result is used for indicating that the second client allows updating of the first game data.

As another optional example, the computer program, when executed by the processor, has a program code implementing the following steps:

a first client sends a first data transfer request to a server, wherein the first data transfer request is used for enabling the server to establish a mapping relationship between the first client and a second client;

the first client acquires second game data sent by the server, wherein the second game data is approved by the server based on first user identification information of the first client, the second game data is obtained through updating, by the second client, the first game data of the first client, and the first game data is sent to the second client by the server according to the mapping relationship.

Optionally, a specific example in the present embodiment may refer to the examples described in the above embodiments, and details are not described herein in the present embodiment.

The non-transitory storage medium may include a data signal that is propagated in a baseband or as part of a carrier, carrying a readable program code. Such propagated data signals may take a variety of forms including, but not limited to, electromagnetic signals, optical signals, or any suitable combination of the foregoing. The non-transitory storage medium may send, propagate, or transmit a program for use by or in connection with an instruction execution system, apparatus, or device.

Program codes included in the non-transitory storage medium may be transmitted by any suitable medium, including but not limited to wireless, wire, optical cable, radio frequency, etc., or any suitable combination of the foregoing.

Optionally, in the present embodiment, the non-transitory storage medium may include, but is not limited to, various media capable of storing a computer program such as a U disk, a Read-Only Memory (ROM), a Random Access Memory (RAM), a mobile hard disk, a magnetic disk, or an optical disc.

An embodiment of the present disclosure also provides an electronic device. The electronic device includes a processor and a memory connected to the processor and configured to store an executable instruction of the processor. The processor is configured to execute the executable instruction including: a mapping relationship is established between a first client and a second client based on a first data transfer request from the first client; first game data of the first client is sent to the second client according to the mapping relationship; second game data from the second client is acquired, wherein the second game data is obtained through updating, by the second client, the first game data; the second game data is verified based on first user identification information of the first client to obtain a verification result; and in response to the verification result indicates that the second game data is approved, the first game data to the second game data is updated.

Figure 9:
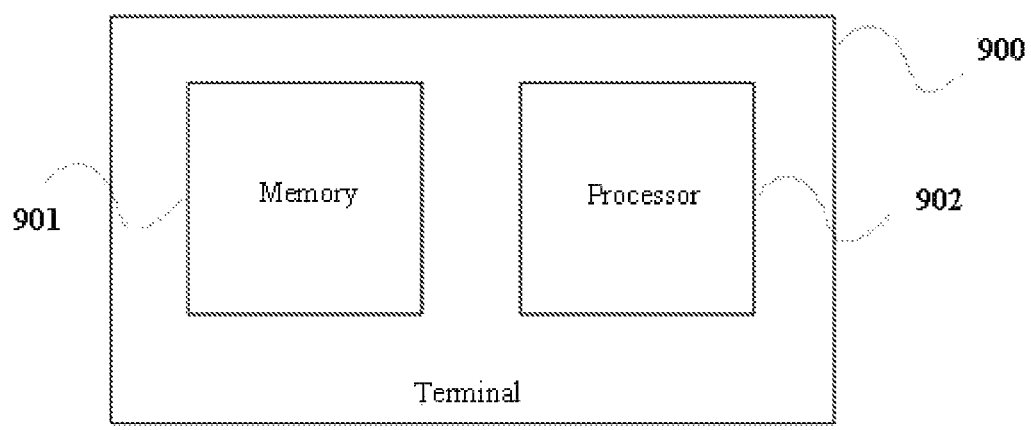
FIG. 9 is a schematic structure diagram of an electronic device according to one embodiment of the present disclosure.

FIG. 9 is a schematic structure diagram of an electronic device according to one embodiment of the present disclosure. As shown in FIG. 9, the electronic device 900 of the present embodiment includes a memory 901 and a processor 902. The memory 901 is configured to store an executable instruction of the processor. The executable instruction may be a computer program. The processor 902 is configured to execute the executable instruction to perform the following steps:

a mapping relationship is established between a first client and a second client based on a first data transfer request from the first client;

first game data of the first client is sent to the second client according to the mapping relationship;

second game data from the second client is acquired, wherein the second game data is obtained through updating, by the second client, the first game data;

the second game data is verified based on first user identification information of the first client to obtain a verification result.

in response to the verification result indicating that the second game data is approved, the first game data is updated to the second game data.

Optionally, the processor 902 is further configured to implement the following steps by executing the executable instruction: before the second game data from the second client is acquired, breaking a connection between a server and the first client, wherein an operation of breaking the connection is used for making the second client be an unique operation object to perform data interaction with the server.

Optionally, the processor 902 is further configured to implement the following steps by executing the executable instruction: after the second game data from the second client is acquired, second user identification information of the second client is acquired from the second game data; it is determined if the second user identification information is in a target field; the first user identification information corresponding to the second user identification information is acquired from the target field.

Optionally, the processor 902 is further configured to implement the following steps by executing the executable instruction: identification information of a virtual character is acquired from the second game data; it is determined that the second game data is approved in response to that the identification information of the virtual character is associated with the acquired first user identification information.

Optionally, the processor 902 is further configured to implement the following steps by executing the executable instruction: second user identification information of the second client is acquired from the first data transfer request; the second user identification information is verified; in response to determining that the second user identification information is approved, the mapping relationship is established between the first client and the second client.

Optionally, the processor 902 is further configured to implement the following steps by executing the executable instruction: in response to determining that the second user identification information is approved, a second data transfer request is sent to the second client; a response result is acquired, wherein the response result is sent by the second client in response to the second data transfer request; in response to the response result indicating that the second client allows to update the first game data, the mapping relationship is established between the first client and the second client.

Optionally, the processor 902 is further configured to implement the following steps by executing the executable instruction: the first user identification information and the second user identification information are recorded in a target field.

Optionally, the processor 902 is further configured to implement the following steps by executing the executable instruction: a target data table from the first client is acquired; the first game data in the target data table is updated to the second game data.

As an optional example, the processor 902 is further configured to implement the following steps by executing the executable instruction:

a second client acquires first game data of a first client, wherein the first game data is sent by a server according to a mapping relationship between the first client and the second client, and the mapping relationship is established by the server based on a first data transfer request from the first client;

the second client updates the first game data to obtain second game data;

the second client sends the second game data to the server, wherein the second game data is verified by the server based on first user identification information of the first client to obtain a verification result, and in response to the verification result indicating that the second game data is approved, the first game data is updated to the second game data.

Optionally, the processor 902 is further configured to implement the following steps by executing the executable instruction: before the second client acquires the first game data of the first client, the second client acquires a second data transfer request, wherein the second data transfer request is sent by the server in response to that the second user identification information of the second client is approved; the second client sends a response result to the server in response to the second data transfer request, wherein the response result is used for indicating that the second client allows updating of the first game data.

As another optional example, the processor 902 is further configured to implement the following steps by executing the executable instruction:

a first client sends a first data transfer request to a server, wherein the first data transfer request is used for enabling the server to establish a mapping relationship between the first client and a second client;

the first client acquires second game data sent by the server, wherein the second game data is approved by the server based on first user identification information of the first client, the second game data is obtained through updating, by the second client, the first game data of the first client, and the first game data is sent to the second client by the server according to the mapping relationship.

Optionally, the electronic device may further include a transmission device and an input/output device, wherein the transmission device is connected to the processor, and the input/output device is connected to the processor.

In an optional implementation method, the electronic device may further include at least one processor, and a memory resource represented by a memory and configured to store an instruction executable by a processing component, such as an application program. The application program stored in the memory may include at least one module each corresponding to a set of instructions. In addition, the processing component is configured to execute instructions to perform the above-described game data processing.

The electronic device may further include: a power supply component, configured to perform power management on the electronic device; a wired or wireless network interface, configured to connect the electronic device to a network; and an Input/Output (I/O) interface. The electronic device may operate based on an operating system stored in the memory, such as Android, iOS, Windows, Mac OS X, Unix, Linux, or FreeBSD.

It will be understood by those of ordinary skill in the art that the structure shown in FIG. 9 is merely illustrative. The electronic device may be an electronic device such as a smart phone, a tablet computer, a palmtop computer, an MID, or a PAD. FIG. 9 does not limit the structure of the above electronic device. For example, the electronic device may further include more or fewer components (such as a network interface or a display device) than shown in FIG. 9, or has a different configuration from that shown in FIG. 9.

Obviously, those skilled in the art should understand that the above modules or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

What is claimed is:

1. A game data processing method, comprising:

establishing a mapping relationship between a first client and a second client based on a first data transfer request from the first client, wherein the first data transfer request is configured for requesting a transfer of first game data of the first client to the second client; the first game data is generated by the first client before sending the first data transfer request, and the first game data corresponds to a first game; and the second client is configured to load the first game data to enter the first game;

sending the first game data of the first client to the second client according to the mapping relationship;

acquiring second game data from the second client, wherein the second game data is obtained through updating, by the second client, the first game data;

verifying the second game data based on first user identification information of the first client to obtain a verification result; and in response to the verification result indicating that the second game data is approved, updating the first game data to the second game data.

2. The method as claimed in claim 1, wherein before acquiring the second game data from the second client, the method further comprises:

breaking a connection between a server and the first client, wherein an operation of breaking the connection is used for making the second client be an unique operation object to perform data interaction with the server.

3. The method as claimed in claim 1, wherein after acquiring the second game data from the second client, the method further comprises:

acquiring second user identification information of the second client from the second game data;

determining if the second user identification information is in a target field; and acquiring the first user identification information corresponding to the second user identification information from the target field.

4. The method as claimed in claim 3, wherein verifying the second game data based on the first user identification information of the first client to obtain a verification result comprises:

acquiring identification information of a virtual character from the second game data; and in response to that the identification information of the virtual character is associated with the acquired first user identification information, determining that the second game data is approved.

5. The method as claimed in claim 1, wherein establishing the mapping relationship between the first client and the second client based on the first data transfer request from the first client comprises:

acquiring second user identification information of the second client from the first data transfer request;

verifying the second user identification information; and in response to determining that the second user identification information is approved, establishing the mapping relationship between the first client and the second client.

6. The method as claimed in claim 5, wherein in response to determining that the second user identification information is approved, establishing the mapping relationship between the first client comprises:

in response to determining that the second user identification information is approved, sending a second data transfer request to the second client;

acquiring a response result, wherein the response result is sent by the second client in response to the second data transfer request; and in response to the response result indicating that the second client allows to update the first game data, establishing the mapping relationship between the first client and the second client.

7. The method as claimed in claim 6, wherein establishing the mapping relationship between the first client and the second client comprises:

recording the first user identification information and the second user identification information in a target field.

8. The method as claimed in claim 6, wherein updating the first game data to the second game data comprises:

acquiring a target data table from the first client; and updating the first game data in the target data table to the second game data.

9. The method according to claim 1, wherein the first client is a client logged in through a first account, and the second client is a client logged in through a second account; or the first client is a client running on a first terminal, and the second client is a client running on a second terminal.

10. A game data processing method, comprising:

acquiring, by a second client, first game data of a first client, wherein the first game data is sent by a server according to a mapping relationship between the first client and the second client, and the mapping relationship is established by the server based on a first data transfer request from the first client, and wherein the first data transfer request is configured for requesting a transfer of the first game data of the first client to the second client; the first game data is generated by the first client before sending the first data transfer request, and the first game data corresponds to a first game; and the second client is configured to load the first game data to enter the first game;

updating, by the second client, the first game data to obtain second game data; and sending, by the second client, the second game data to the server, wherein the second game data is verified by the server based on first user identification information of the first client to obtain a verification result, and in response to the verification result indicating that the second game data is approved, the first game data is updated to the second game data.

11. The method as claimed in claim 10, wherein before acquiring, by the second client, first game data of a first client, the method further comprises:

acquiring, by the second client, a second data transfer request, wherein the second data transfer request is sent by the server in response to that the second user identification information of the second client is approved; and sending, by the second client, a response result to the server in response to the second data transfer request, wherein the response result is used for indicating that the second client allows updating of the first game data.

12. A game data processing method, comprising:

generating, by a first client, first game data, wherein the first game data corresponds to a first game;

sending, by the first client, a first data transfer request to a server, wherein the first data transfer request is used for requesting a transfer of the first game data of the first client to a second client, and enabling the server to establish a mapping relationship between the first client and the second client, and wherein the second client is configured to load the first game data to enter the first game; and acquiring, by the first client, second game data sent by the server, wherein the second game data is approved by the server based on first user identification information of the first client, the second game data is obtained through updating, by the second client, the first game data of the first client, and the first game data is sent to the second client by the server according to the mapping relationship.

13. A non-transitory storage medium, storing a computer program that, when executed by a processor, controls a device where the non-transitory storage medium is located to perform the following steps:

establishing a mapping relationship between a first client and a second client based on a first data transfer request from the first client, wherein the first data transfer request is configured for requesting a transfer of first game data of the first client to the second client; the first game data is generated by the first client before sending the first data transfer request, and the first game data corresponds to a first game; and the second client is configured to load the first game data to enter the first game;

sending the first game data of the first client to the second client according to the mapping relationship;

acquiring second game data from the second client, wherein the second game data is obtained through updating, by the second client, the first game data;

verifying the second game data based on first user identification information of the first client to obtain a verification result; and in response to the verification result indicating that the second game data is approved, updating the first game data to the second game data.

14. An electronic device, comprising a memory and a processor, wherein the memory stores a computer program, and the processor is configured to execute the computer program to perform the following steps:

establishing a mapping relationship between a first client and a second client based on a first data transfer request from the first client, wherein the first data transfer request is configured for requesting a transfer of first game data of the first client to the second client; the first game data is generated by the first client before sending the first data transfer request, and the first game data corresponds to a first game; and the second client is configured to load the first game data to enter the first game;

sending the first game data of the first client to the second client according to the mapping relationship;

acquiring second game data from the second client, wherein the second game data is obtained through updating, by the second client, the first game data;

verifying the second game data based on first user identification information of the first client to obtain a verification result; and in response to the verification result indicating that the second game data is approved, updating the first game data to the second game data.

15. The method as claimed in claim 3, wherein determining if the second user identification information is in a target field comprises:

determining if the second user identification information is in the target field in a record data table, wherein the record data table is a battle record table for recording battle data.

16. The method as claimed in claim 4, wherein the identification information is a skill identifier of the virtual character.

17. The method as claimed in claim 6, wherein the second data transfer request is used for inquiring whether the second client continues to participate in a game in place of the first client.

18. The method as claimed in claim 2, wherein the method further comprises:

stop acquiring a data request from the first client, wherein the data request is used for establishing the connection between the server and the first client.

19. The method as claimed in claim 10, wherein before the second game data from the second client is acquired by the server, a data request from the first client is stopped acquiring by the server, wherein the data request is used for establishing a connection between the server and the first client.

20. The method as claimed in claim 12, wherein before the second game data from the second client is acquired by the server, a data request from the first client is stopped acquiring by the server, wherein the data request is used for establishing a connection between the server and the first client.

* * * * *